(12) United States Patent (10) Patent No.: US 7,647,910 B2
Solfrank (45) Date of Patent: Jan. 19, 2010

(54) COMPENSATING SHAFT FOR AN ENGINE

(75) Inventor: Peter Solfrank, Frensdorf (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 12/185,918

(22) Filed: Aug. 5, 2008

(65) Prior Publication Data

US 2009/0044779 A1  Feb. 19, 2009

Related U.S. Application Data

(60) Provisional application No. 60/956,481, filed on Aug. 17, 2007.

(51) Int. Cl.
*F02B 75/06* (2006.01)
(52) U.S. Cl. ..................... 123/192.2; 74/603
(58) Field of Classification Search ............. 123/192.2; 74/603, 604
See application file for complete search history.

(56) References Cited

FOREIGN PATENT DOCUMENTS

DE  102004014014  10/2005

*Primary Examiner*—Noah Kamen
(74) *Attorney, Agent, or Firm*—Volpe and Koenig, P.C.

(57) ABSTRACT

A compensating shaft (1, 1a, 1b, 1c, 1d) for compensating mass forces and/or mass moments of a reciprocating piston internal combustion engine (13) is provided, with at least one bearing journal (2a, 2b, 2c, 2d), on whose outer casing surface (3a, 3b, 3c, 3d) the compensating shaft is supported in the radial direction in a housing support (10) of the reciprocating piston internal combustion engine, and with at least one unbalanced section (4) bordering the bearing journal in the axial direction. The outer casing surface of the bearing journal is formed on the side of the unbalanced section facing away from the unbalanced direction by a cylindrical section (5) of the bearing journal and by one or more axial projections (7a, 7b, 7c, 7d), wherein these axial projections extend like a collar from the cylindrical section while forming a radial undercut (6).

8 Claims, 2 Drawing Sheets

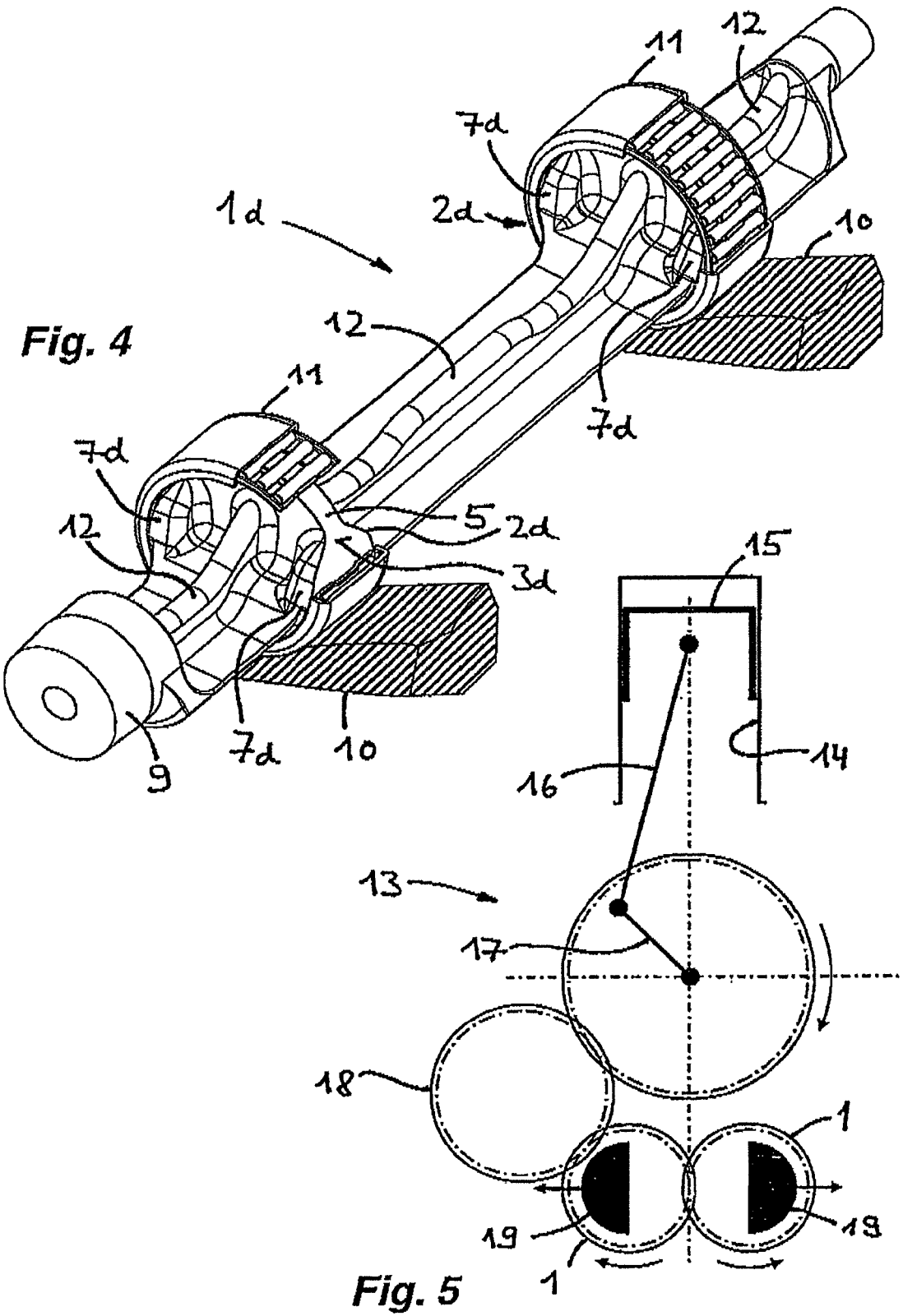

COMPENSATING SHAFT FOR AN ENGINE

CROSS-REFERENCE TO RELATED APPLICATIONS

This application claims the benefit of U.S. Provisional Appln. No. 60/956,481, filed Aug. 17, 2007, which is incorporated herein by reference as if fully set forth.

BACKGROUND

The invention relates to a compensating shaft for compensating mass forces and/or mass moments of a reciprocating piston internal combustion engine. The compensating shaft has at least one bearing journal, on whose outer casing surface the compensating shaft is supported in the radial direction at a housing support position in the reciprocating piston internal combustion engine, and at least one unbalanced section bordering the bearing journal in the axial direction.

Such a compensating shaft is known from DE 10 2004 014 014 A1, which is viewed as a class-forming patent. The compensating shaft proposed there has two bearing journals each with unbalanced sections bordering both sides. In a known way, the unbalanced effect of the unbalanced sections rotating with the compensating shaft acts against the free mass forces and/or mass moments of the reciprocating piston internal combustion engine, in that the unbalanced force is introduced via the bearing journals into associated housing support positions of the reciprocating piston internal combustion engine. The unbalanced direction, which is stationary relative to the bearing journal, is directed onto the side of the unbalanced section facing the unbalanced direction for forming a load zone on the bearing journal, while this bearing journal is load free or at most minimally loaded due to dynamic effects on the side of the unbalanced section facing away from the unbalanced direction. Consequently, solid bearing journals of a compensating shaft according to the cited document are mechanically overdimensioned in their load-free or low-load peripheral region. Such overdimensioning, however, is equivalent to unnecessarily carrying along material and consequently mass and directly counteracts the increasing effort for lightweight construction, which conserves resources and the environment, especially in the automotive industry.

SUMMARY

The present invention is therefore based on the objective of improving a compensating shaft of the type noted above, in such a way that the mentioned disadvantage is overcome with simple means. Consequently, with an identical or improved function, the compensating shaft should have significant reduction in mass relative to known constructions.

This objective is met by a compensating shaft with the features of the present invention, and advantageous improvements and configurations can be taken from the description that follows. According to the invention, the outer casing surface of the bearing journal of the compensating shaft is formed on the side of the unbalanced section facing away from the unbalanced direction geometrically by a cylindrical section of the bearing journal and by one or more axial projections, which extend like a collar from the cylindrical section with the formation of a radial undercut. Due to the radial undercut or undercuts, the bearing journal on the side of the unbalanced section facing away from the unbalanced direction, i.e., on its load-free or low-load peripheral region, is quasi hollowed out, while the remaining cylindrical section provides for a still adequate structure stiffness of the bearing journal in the transverse direction of the compensating shaft. The lightweight construction of the compensating shaft here results only partially from the mass corresponding to the hollowed-out part of the bearing journal. Instead, the possibility and/or necessity to restore the original unbalanced effect of a compensating shaft with solid, cylindrical bearing journals following directly from such a bearing journal construction has considerable and usually much larger portion of the mass reduction. Accordingly, further displacement of the eccentric mass center of gravity caused by the hollowed-out section of the bearing journal in the unbalanced direction of the compensating shaft can or must be compensated in such a way that material outside of the bearing journal is also taken from the compensating shaft on the side of the unbalanced section facing the unbalanced direction.

In one advantageous improvement of the invention, the bearing journal should have a mirror-symmetric construction to the transverse center plane of its outer casing surface for a corresponding axial arrangement of the cylindrical section in the bearing journal and also for a corresponding number, arrangement, and configuration of the axial projections. In other words, the cylindrical section should run in the middle in the axial direction in the bearing journal, while, for example, an uninterrupted axial projection or several axial projections, which are independent of each other and which have a paired, mirror symmetric construction to the cylindrical section, can be provided on both sides of the cylindrical section. As explained in an embodiment of the invention described below, however, it can also alternatively be provided to arrange the cylindrical section eccentric in the axial direction in the bearing journal and, for example, on the end in this bearing journal, wherein then the axial projection or projections extend only from one side of the cylindrical section.

In addition, it is useful, in particular, with respect to a construction of the bearing journal as a hydrodynamic sliding bearing, if the number, arrangement, and configuration of the axial projections is selected in such a way that the outer casing surface of the bearing journal has a constant width across its periphery. Independent of the local loading of the bearing journal in the unbalanced direction, in this way, the build-up of a load-bearing lubricant film in the sliding bearing is guaranteed.

Furthermore, if the number, arrangement, and construction of the axial projections should also be able to be selected in such a way that the outer casing surface of the bearing journal has a width that is variable across its periphery, wherein the outer casing surface is tapered significantly on the side of the unbalanced section facing away from the unbalanced direction opposite the side of the unbalanced section facing the unbalanced direction. Such a shaping of the outer casing surface consistently exploits the lightweight construction potential described above, which is offered by the at most only low loading of the bearing journal on the side of the unbalanced section facing away from the unbalanced direction. One construction of the bearing journal that is especially advantageous in this respect is then given when the minimal width of the tapered outer casing surface essentially corresponds to the width of the cylindrical section.

Independent of whether the outer casing surface has a variable or constant width across the periphery of the bearing journal, it is further provided as an alternative not only to a hydrodynamic, but also to a mechanical sliding bearing, that the outer casing surface of the bearing journal is used as a bearing seat for a roller bearing, by means of which the compensating shaft is supported in the housing support of the reciprocating piston internal combustion engine. A radial installation space saving and economical radial bearing of the compensating shaft is given especially when the roller bearing is constructed as a needle sleeve, wherein the outer casing surface of the bearing journal is used in this case as an inner race for the needles of the needle sleeve. In a known way, the needle sleeve involves a structural unit made from a thin-walled outer ring formed using a non-cutting method, a cage, and needles arranged therein.

In addition, the reciprocating piston internal combustion engine is preferably a four-cylinder in-line engine with two compensating shafts rotating in opposite directions with twice the crankshaft rotational speed. This arrangement of compensating shafts, which is also known to those skilled in the art as a Lancaster compensation, is used for compensating the free second-order mass forces.

Finally, the features and constructions noted above should also be able to be combined with each other in any way as far as possible and useful.

BRIEF DESCRIPTION OF THE SEVERAL VIEWS OF THE DRAWINGS

Additional features of the invention emerge from the following description and from the drawings, in which embodiments of compensating shafts according to the invention are shown in perspective and partially simplified. As long as not mentioned otherwise, features or components that are identical or functionally identical are provided with identical reference numbers. Shown are:

FIG. 4 is an overall view of a roller-supported compensating shaft, and FIG. 5 is a schematic view of a reciprocating piston internal combustion engine with mass compensation.

DETAILED DESCRIPTION OF THE PREFERRED EMBODIMENTS

Figure 1:
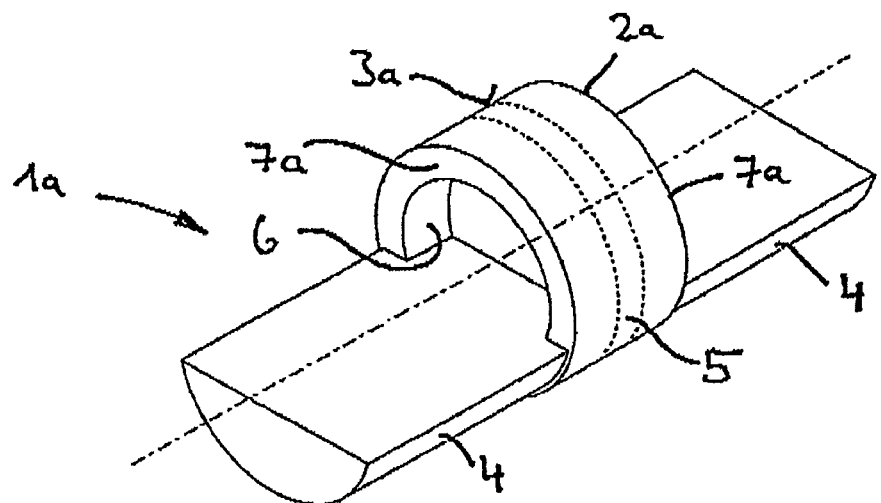
FIG. 1 is a cutaway view of a compensating shaft with an outer casing surface of a mirror-symmetric bearing journal with constant width.
Figure 2:
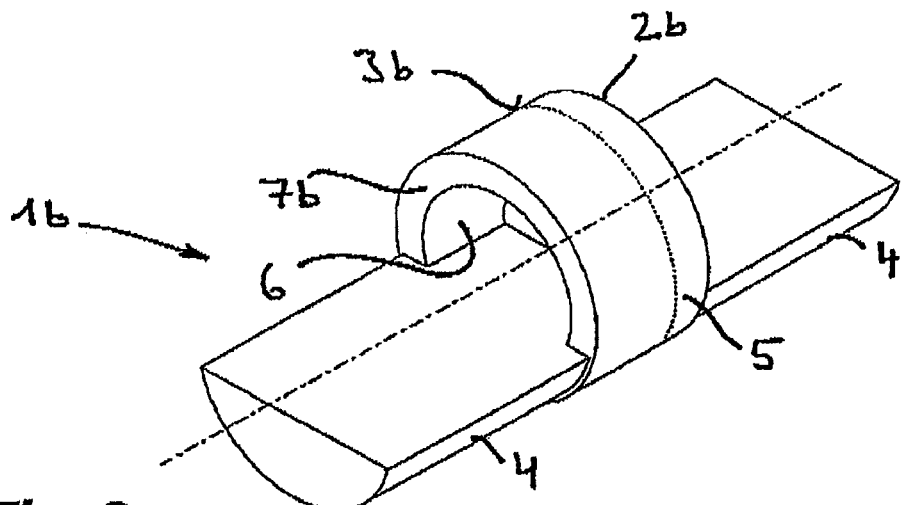
FIG. 2 is a cutaway view of a compensating shaft with an outer casing surface of a non-mirror-symmetric bearing journal with constant width.
Figure 3:
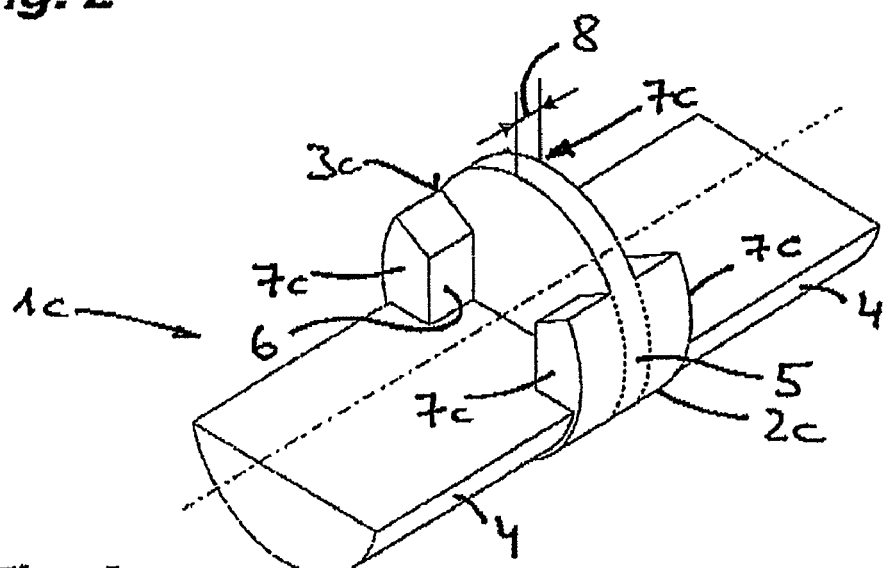
FIG. 3 is a cutaway view of a compensating shaft with an outer casing surface of a mirror-symmetric bearing journal with variable width.

In FIGS. 1 to 3, sections of compensating shafts 1a, 1b, and 1c, which are essential for understanding the invention and which are shown greatly simplified and which are used for compensating mass forces and/or mass moments of a reciprocating piston internal combustion engine, are disclosed. Shown are bearing journals 2a, 2b, and 2c, on whose outer casing surfaces 3a, 3b, and 3c, the compensating shafts 1a, 1b, 1c are each supported in the radial direction in a housing support of the reciprocating piston internal combustion engine, not shown here. Unbalanced sections 4, which border the bearing journals in the axial direction and whose unbalanced mass counteract the free mass forces and/or mass moments of the reciprocating piston internal combustion engine in a known and defined way, extend on both sides of the bearing journals 2a, 2b, 2c. Considered geometrically, the bearing journals 2a, 2b, 2c can each be subdivided into a cylindrical section 5 shown with dashed lines and one or more axial projections, which extend like a collar from the cylindrical sections 5 on the side of the unbalanced sections 4 facing away from the unbalanced direction. This geometric consideration applies analogously for the contours of the outer casing surfaces 3a, 3b, 3c of the bearing journals 2a, 2b, 2c.

The bearing journal 2a shown in FIG. 1 has a mirror-symmetric construction to the transverse center plane of its outer casing surface 3a, in which the cylindrical section 5 extends in the axial direction in the center relative to the outer casing surface 3a and an axial projection 7a that is uninterrupted across the peripheral region and that forms a radial undercut 6 extends from both sides of the cylindrical section 5. As described above, the radial undercuts 6 are equivalent to a hollowing out of a solid, cylindrical bearing journal, which reduces the mass, wherein the mass reduction leads to additional displacement of the mass center of gravity in the unbalanced direction of the compensating shafts 1a, 1b, 1c. This additional displacement can or must be compensated by corresponding removal of material at the unbalanced sections 4, equivalent with a mass reduction extending across the hollowed-out part of the bearing journals 2a, 2b, and 2c.

The bearing journal 2b shown in FIG. 2 differs from the bearing journal 2a in such a way that the cylindrical section 5 is here arranged not in the center in the axial direction, but instead at the end with respect to the outer casing surface 3b. The bearing journal 2b with a consequently non-mirror-symmetric construction to the transverse middle plane of the outer casing surface 3b has accordingly only one axial projection 7b and a radial undercut 6 formed by this projection.

While the outer casing surfaces 3a, 3b of the bearing journals 2a, 2b shown in FIGS. 1 and 2 have a width that is constant across its periphery, the outer casing surface 3c of the bearing journal 2c tapers significantly according to FIG. 3 on the side of the unbalanced section 4 facing away from the unbalanced direction, wherein, here, the minimal width of the outer casing surface 3c corresponds to the width 8 of the cylindrical section 5. The bearing journal 2c with, in turn, a mirror-symmetric construction to the transverse middle plane of its outer casing surface 3c has on each side of the cylindrical section 5 has two axial projections 7c separated from each other and extending paired mirror-symmetric to the transverse middle plane with the associated radial undercuts 6.

FIG. 4 shows a compensating shaft 1d according to the invention in full view. The compensating shaft 1d is driven at a drive section 9, for example, by a chain wheel or a gear wheel and comprises two bearing journals 2d, on whose outer casing surfaces 3d the compensating shaft 1d is supported by roller bearings 11 in the radial direction in housing supports 10 only indicated here of the reciprocating piston internal combustion engine. The construction of the bearing journal 2d with a cylindrical section 5 arranged in the middle in the axial direction and axial projections 7d extending from both sides of this section is identical and corresponds geometrically to the bearing journal 2c shown in FIG. 3, wherein its outer casing surfaces 3d are each used as inner races for the needles of the roller bearings 11, which are constructed here as needle sleeves.

With respect to the mentioned compensating shafts, at this point it should be explicitly noted that the term "cylindrical section" is to be understood less as a cylinder in the strict geometric sense (as shown, in particular, in FIG. 3), but instead also as a bearing journal section, which essentially has the shape of a cylinder. Thus, for example, cast bevels, which are necessary for the production of cast or forged compensating shafts, lead to the result that the width of the cylindrical section 5 in the tapered peripheral section of the bearing journal 2c or 2d falls below the width of the region shown with dashed lines in FIG. 3. A corresponding situation applies for chamfers or the like, so that, for example, the minimal width shown in FIG. 3 of the outer casing surface 3c is actually produced from the width 8 of the cylindrical section 5 minus the chamfers and/or the cast bevels.

For reinforcing the compensating shaft 1d, braces 12 are used that extend from the bearing journal 3d and that keep the deformation of the compensating shaft 1d within tolerable limits also for very high rotational speeds, especially with respect to impermissible tilting of the bearing journal 2d in the needle sleeves 11.

The preferred application of the invention relates to a reciprocating piston internal combustion engine in a 4-cylinder in-line construction with a mass compensation gear also known as Lancaster compensation for compensating free second order mass forces. Such a mass compensation drive emerges from the gear schematic shown in FIG. 5 of the reciprocating piston internal combustion engine shown designated with 13. In a known way, this comprises a piston 15, which oscillates in a cylinder 14 and whose longitudinal movement is converted by a connecting rod 16 into a rotation of a crankshaft 17. The crankshaft 17 drives two compensating shafts 1 with unbalanced mass 19—here by an intermediate shaft 18—wherein the compensating shafts 1 rotate in opposite sense parallel to the crankshaft 17 with twice the crankshaft rotational speed.

LIST OF REFERENCE SYMBOLS 1, 1a-d Compensating shaft
2a-d Bearing journal
3a-d Outer casing surface
4 Unbalanced section
5 Cylindrical section
6 Radial undercut
7a-d Axial projection
8 Width of the cylindrical section
9 Drive section
10 Housing support
11 Roller bearing/needle sleeve
12 Brace
13 Reciprocating piston internal combustion engine
14 Cylinder
15 Piston
16 Connecting rod
17 Crankshaft
18 Intermediate shaft
19 Unbalanced mass

The invention claimed is:

1. Compensating shaft for compensating mass forces and/or mass moments of a reciprocating piston internal combustion engine, the compensating shaft comprising at least one bearing journal having an outer casing surface that supports the compensating shaft in a radial direction in a housing support of the reciprocating piston internal combustion engine, at least one unbalanced section bordering the bearing journal in the axial direction, the outer casing surface of the bearing journal is formed on a side of the unbalanced section facing away from an unbalanced direction by a cylindrical section of the bearing journal and by at least one axial projection, the at least one axial projection extends like a collar from the cylindrical section and forms a radial undercut.

2. Compensating shaft according to claim 1, wherein an axial location of the cylindrical section in the bearing journal and a number, arrangement, and construction of the at least one axial projection are arranged so that the bearing journal has a mirror-symmetric configuration to a transverse middle plane of the outer casing surface.

3. Compensating shaft according to claim 1, wherein a number, arrangement, and construction of the at least one axial projection forms the outer casing surface of the bearing journal with a width that is constant across a periphery thereof.

4. Compensating shaft according to claim 1, wherein a number, arrangement, and construction of the at least one axial projection forms the outer casing surface of the bearing journal with a width that is variable across a periphery thereof, and the outer casing surface is tapered significantly on a side of the unbalanced section facing away from the unbalanced direction relative to a side of the unbalanced section facing the unbalanced direction.

5. Compensating shaft according to claim 4, wherein a minimum width of the outer casing surface essentially corresponds to a width of the cylindrical section.

6. Compensating shaft according to claim 1, wherein the outer casing surface of the bearing journal is a bearing seat for a roller bearing, by which roller bearing, the compensating shaft is supported in the housing support of the reciprocating piston internal combustion engine.

7. Compensating shaft according to claim 6, wherein the roller bearing is constructed as a needle sleeve, and the outer casing surface of the bearing journal is used as an inner race for needles of the needle sleeve.

8. Compensating shaft according to claim 1, wherein the reciprocating piston internal combustion engine is a four-cylinder in-line engine with two compensating shafts rotating in opposite directions with twice a crankshaft rotational speed.

* * * * *